Dec. 7, 1943.  E. L. FISCHER  2,336,396

SHUTTER RELEASE FOR FOLDING CAMERAS

Filed April 2, 1941

EDWIN L. FISCHER
INVENTOR

BY
ATTORNEYS

Patented Dec. 7, 1943

2,336,396

UNITED STATES PATENT OFFICE 2,336,396

SHUTTER RELEASE FOR FOLDING CAMERAS

Edwin L. Fischer, Endwell, N. Y., assignor to General Aniline & Film Corporation, New York, N. Y., a corporation of Delaware Application April 2, 1941, Serial No. 386,469

3 Claims. (Cl. 95—53)

The present invention involves a shutter release for folding cameras, and more particularly a shutter release mechanism which includes an operating member mounted on the camera body.

Cameras are well known in which a movable bed is hinged to the camera body for movement between open and closed positions. In these cameras the lens and shutter are usually mounted on a camera front which can be extended and retracted with reference to the camera body when the bed is opened and closed. With this type of construction it is often difficult for the operator to manipulate the customary shutter release lever on the projecting camera front.

It has accordingly been proposed that a release button should be mounted on the camera body where it can be reached by the operator without difficulty. A suitable interconnecting mechanism must then be provided to connect this operating button with the shutter mechanism.

It is one object of the present invention to provide an improved shutter releasing mechanism for a folding camera.

It is another object to provide a folding camera with a shutter release button on the camera body, which is operably connected to the usual shutter actuating arm when the camera is in its open or extended position.

It is a further object to provide a body shutter release construction in which a single rotatable spindle is mounted on the camera bed and is operably connected at all times to a movable slide on the camera body.

Other objects and advantages of the proposed construction will be apparent from the following description.

In the drawing, which forms a part of this application,

In order that those persons skilled in the art may understand fully the exact nature and scope of my invention, I shall now give a detailed description thereof with particular reference to the accompanying drawing, wherein like reference characters indicate like parts.

Figure 1:
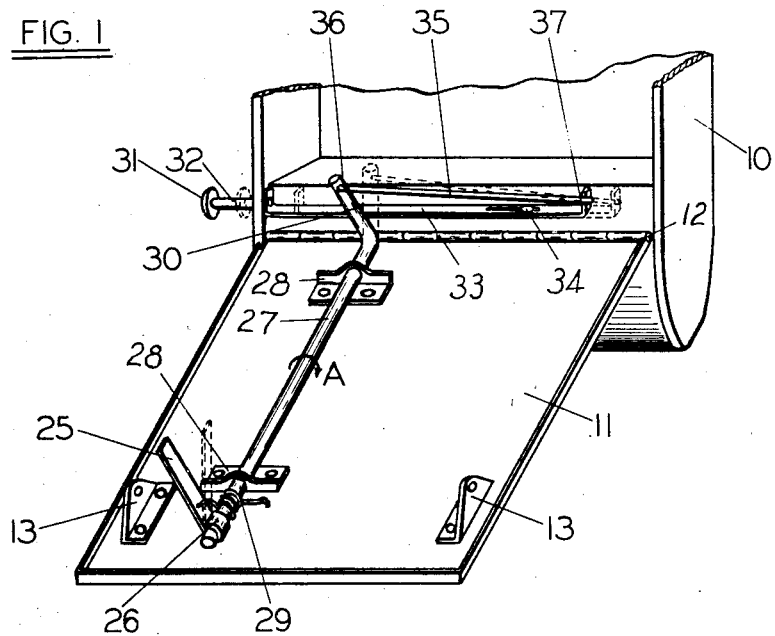
Figure 1 is a front perspective view of a camera provided with a body shutter release mechanism according to the present invention, the customary lens, shutter, bellows and camera front supporting mechanism being omitted for clearness.

As shown in Figure 1, the camera body 10 is provided with a movable bed 11 hinged to the camera body at 12. At the front end of the bed 11 are two brackets 13 to which are pivoted at 14 the supporting links 15 for the camera front or shutter plate 17. These links 15 are pivoted to flanges on the plate 17 at points 16.

Plate 17 in turn carries the usual shutter casing 18 in which shutter blades and blade actuating mechanism of any desired construction may be incorporated.

It will be understood that the camera front plate 17 may be extended and retracted automatically with reference to the camera body when the camera bed is opened and closed. Since the particular erecting mechanism for this camera front constitutes no part of the present invention, a detailed description thereof is deemed unnecessary. Typical examples of such self-erecting front constructions are shown in U. S. Patents 1,793,925—Goldhammer; 2,005,820—Bornmann et al.; and 2,097,197—Lessler.

The shutter 18 is provided with the usual shuttle actuating lever 19 which protrudes from the shutter casing. This lever is pivoted within the shutter casing and is movable, for example from left to right in Figure 2.

I have found it desirable to provide a movable slide 20 for operation of the actuating lever 19. This slide 20 is provided with slots 21 which engage pins 22 on the camera front plate 17. Thus the slide is movable laterally back and forth across said plate. A flange member 23 on slide 20 is positioned so that it will engage the shutter actuating lever or trigger 19 to operate said shutter when the slide is moved from left to right in Figure 2. The slide is also provided with a downwardly projecting pin or lug 24 which will be engaged by the shutter actuating mechanism in the manner described more fully below.

When the camera is in open position, the camera front including plate 17 will be positioned over the camera bed as described. In this open position the projecting pin 24 will be directly adjacent to and in the path of an upstanding arm 25 fastened at 26 to a rotatable spindle 27. This spindle or axle 27 extends longitudinally of the camera bed and is mounted in brackets 28 fastened to said bed. It will be apparent from the drawing that rotation of spindle 27 in the direction of arrow A will cause the upturned arm 25 to rotate in a clockwise direction with reference to Figure 2, said arm thereby engaging the pin 24 on slide 20 to force said slide from left to right for actuation of the shutter. It is obvious that when the camera is in folded position, the front plate 17 and slide 20 will be withdrawn into the camera and consequently the pin 24 on slide 20 will not be in the path of arm 25. Thus any movement of the spindle and arm when the camera is in closed position will not actuate the shutter.

Figure 2:
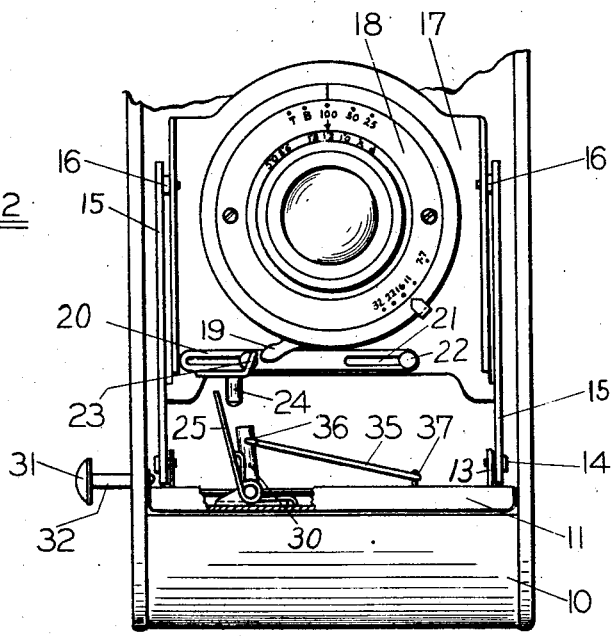
Figure 2 is a front view of the same mechanism with the camera front and shutter included.

Spindle 27 is provided with a spring 29, one end of which engages arm 25, and the other end of which engages the camera bed for urging the arm 25 and spindle 27 in a counterclockwise direction with reference to Figure 2. Thus the spring causes the necessary return movement of the spindle and arm after the shutter has been actuated. It will be apparent that any equivalent spring return means can be provided.

Slide 20 is of course returned to its starting position, after the shutter has been operated, by the engagement of trigger 19 with flange 23. Trigger 19 returns to starting position under spring tension in the manner well known in the shutter art, and thus carries slide 20 also to starting position.

At the opposite end of spindle 27 from arm 25, i. e. at the end of the spindle which is close to the camera bed hinge, the spindle is provided with another upstanding arm 30. This arm is linked, by mechanism to be described, with a shutter operating member or release button 31 on the camera body. Button 31 is mounted on a rod or slide 32, which is movable through a side wall of the camera near the point of hinging of the camera bed and in a direction substantially parallel to said hinge. The rod 32 is directly connected with a slide 33 which is mounted within the camera body by a pin and slot connection 34. Rod 32 may, if desired, be formed as an integral part of slide 33, or the rod may be a separate member directly fastened to said slide as shown in the drawing. Slide 33 is similarly movable substantially parallel to the camera bed hinge and is mounted relatively near said hinge. Slide 33 is connected to arm 30 of a spindle 27 by a single universal link 35. Link 35, which in the preferred form of my invention consists of a relatively strong wire or thin rod, is provided at one end with a hook 36 which engages an opening in the end of arm 30 for connecting said link and arm. It will be obvious that this hook connection permits relative rotation between the link 35 and arm 30 during operation of the shutter.

The other end of link 35 is likewise provided with a hook 37 for engagement in a suitable opening in slide 33. In the drawing I have provided an upturned flange on slide 33 at the end of said slide opposite from the release button 31.

It will be apparent from the foregoing description and from the drawing that movement of button 31 from the heavy line position to the dotted line position in Figure 1 will move slide 33 and will also, by reason of link 35, pull arm 30 to rotate spindle 27 in the direction of arrow A for actuation of the shutter. This pulling movement is of importance in transmitting motion from slide 33 to arm 30, since a much more positive connection is obtained than in any previous constructions where a shutter actuating member on the camera bed is pushed by a link connected to the release button. The great advantage of the pulling connection lies in the fact that the so-called angle of attack is reduced and there is consequently less opportunity for binding which would hinder the smooth operation of the parts. I consider the use of this pull link an important feature of the present invention.

The return movement of spindle 27 under the influence of spring 29 will restore the slide 33 and button 31 to their original positions because of the connection through link 35.

Because of the pivotal connections of link 35 with arm 30 and slide 33, it will also be clear that the camera bed 11 can be moved to its folded or closed position while arm 30, link 35, and slide 33 remain connected to each other at all times. Link 35 and the arm and slide are relatively close to the camera bed hinge and accordingly only a limited relative rotation between these parts is necessary.

From the preceding description it will be apparent that I have provided an improved body shutter release mechanism for folding cameras. Since various equivalent forms of construction will be readily apparent to those persons skilled in the art, it is not my invention to limit myself to the exact structure embodied in the drawing as an example of the invention.

Now therefore I claim:

1. A folding camera having a body, a bed hinged to said body for movement between open and closed positions, a camera front movable between a retracted position when the bed is closed and an extended position along said bed when the bed is open, a shutter carried by said camera front and having a shutter actuating arm extending toward said bed and movable substantially laterally thereof to operate said shutter, a shutter release button mounted in a wall of said camera near the camera bed hinge, a single rotatable spindle extending longitudinally of said bed from front to rear, the front end of said spindle having an upturned arm for engaging and operating said shutter actuating arm, the other end of said spindle also having an upturned arm near the camera bed hinge, a slide in the camera body engaged by said release button and movable substantially parallel to the camera bed hinge, and a link pivotally connected to said last-mentioned upturned arm and to the end of said slide remote from said release button for movement of said spindle and shutter actuating lever through operation of said release button, said link remaining connected to said arm and slide regardless of movement of the camera bed between open and closed positions.

2. A folding camera having a body, a bed hinged to said body for movement between open and closed positions, a camera front movable between a retracted position when the bed is closed and an extended position along said bed when the bed is open, a shutter carried by said camera front and having a shutter actuating arm extending toward said bed and movable substantially laterally thereof to operate said shutter, a shutter release button mounted in a wall of said camera near the camera bed hinge, a single rotatable spindle extending longitudinally of said bed from front to rear, the front end of said spindle having an upturned arm for engaging and operating said shutter actuating arm, a spring on said spindle engaging said upturned arm and said camera bed for urging said arm out of engagement with said shutter actuating arm, the other end of said spindle also having an upturned arm near the camera bed hinge, a slide in the camera body engaged by said release button and movable substantially parallel to the camera bed hinge, and a link pivotally connected to said last-mentioned upturned arm and to the end of said slide remote from said release button for movement of said spindle and shutter actuton, said link remaining connected to said arm and slide regardless of movement of the camera bed between open and closed positions.

3. A folding camera having a body, a bed hinged to said body for movement between open and closed positions, a camera front movable between a retracted position when the bed is closed and an extended position along said bed when the bed is open, a shutter carried by said camera front and having a shutter actuating arm extending toward said bed and movable substantially laterally thereof to operate said shutter, a shutter release button mounted in a wall of said camera near the camera bed hinge, a single rotatable spindle extending longitudinally of said bed from front to rear near the lateral edge of said bed on the same side of the camera as the release button, the front end of said spindle having an upturned arm for operating said shutter actuating arm, the other end of said spindle also having an upturned arm near the camera bed hinge, a slide in the camera body engaged by said release button and movable substantially parallel to the camera bed hinge, and a link pivotally connected to said last-mentioned upturned arm and to the end of said slide remote from said release button for pulling said arm and actuating said shutter when said release button is operated.

EDWIN L. FISCHER.